Nov. 19, 1963 — C. P. HOSTETLER — 3,111,034
FRUIT SAMPLER
Filed Dec. 28, 1960
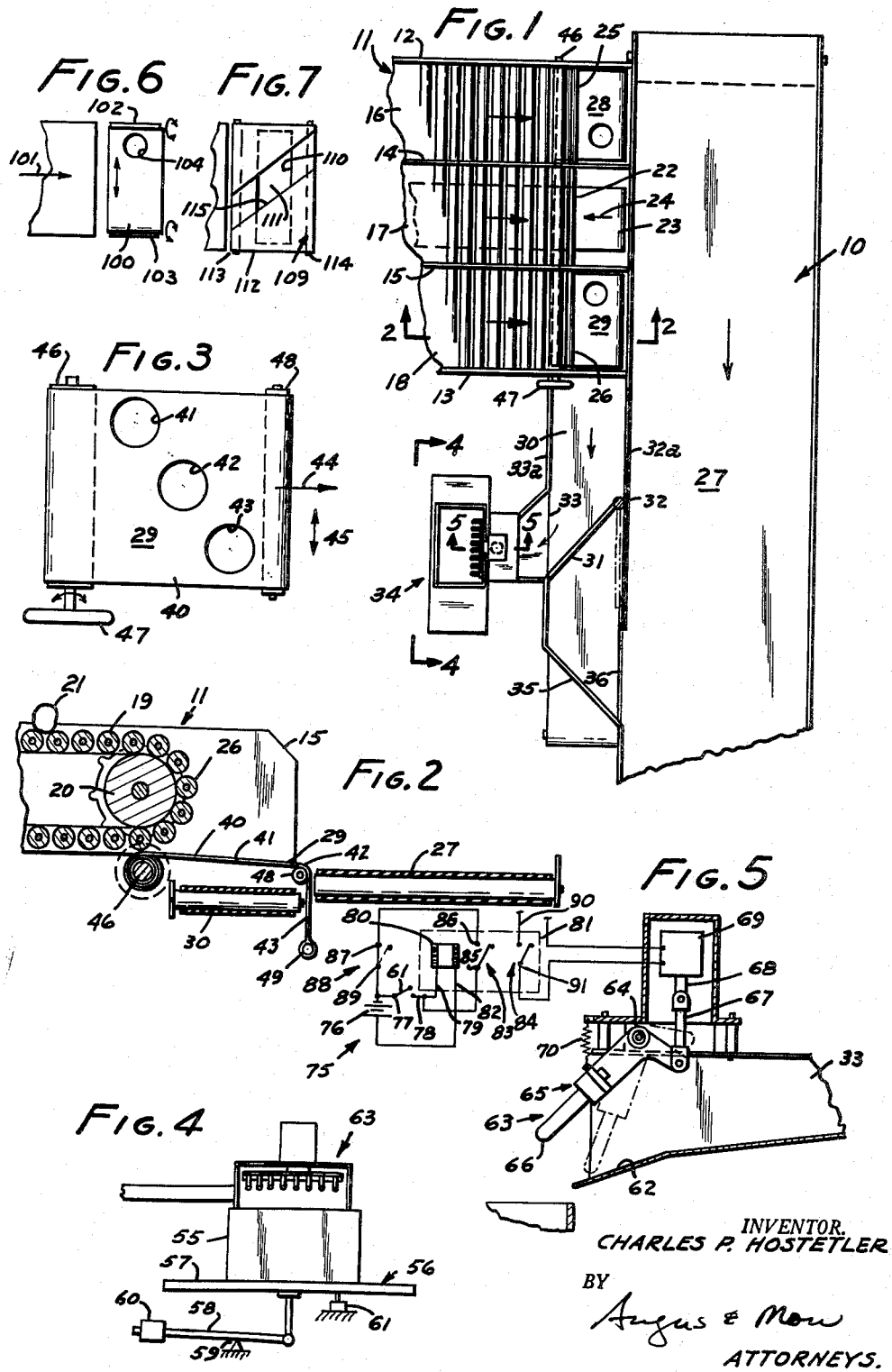
INVENTOR.
CHARLES P. HOSTETLER
BY
Angus & Mow
ATTORNEYS.

3,111,034
FRUIT SAMPLER
Charles P. Hostetler, Redlands, Calif., assignor to Fruit Equipment Service, Redlands, Calif., a corporation of California
Filed Dec. 28, 1960, Ser. No. 78,898
7 Claims. (Cl. 73—421)

This invention relates to a fruit sampling station.

In the handling of fruits and the like in the field, it is customary to take the entire supply from the field bins, run it over sizers to dispose of undersized fruit, pass it over a grading table where sorters remove blemished and otherwise sub-standard fruit, and then put the fruit in bins for carriage to a cannery. Between the conclusion of the sizing and grading operations, and the placing of the fruit into the bins, government inspectors remove a representative sample of the fruit in order to determine whether the fruit is up to standard. Then, once the inspector has approved the sample, the content of the bins is entirely first class fruit ready for canning or other operations. This eliminates extensive shipping and handling of sub-standard fruit.

In order for the sampling to be truly representative, means should be provided to enable the inspector to remove fruit from the process at several places and at randomly selected times, thus achieving a completely random sampling. Furthermore, enabling the fruit to be withdrawn in this manner frustrates any efforts of personnel upstream from the inspection point to slip sub-standard fruit past the inspector by routing it along paths unlikely to be sampled.

It is an object of this invention to provide a simple easily-operable means for drawing such a random sample of fruit from the flow emanating from the grading table. It is a further object to supply such samples in a predetermined, requisite weight.

A device according to this invention includes a primary conveyor for receiving fruit from a source such as a grading table, and conveying it to a bin. In its path from the source to the primary conveyor, the fruit passes over a perforated apron. This apron bridges over a sampling conveyor which conveys fruit which falls through a perforation in the apron to a collecting station.

A feature of the invention resides in positioning a perforation in the apron so that it can be disposed at various lateral positions in the path of the fruit and withdraw fruit at these positions.

According to a preferred but optional feature of the invention, the collecting station includes a gate which can be opened and shut, and which discharges fruit into a box where the sample is ultimately collected. The box is supported by scale means which control the gate so that the gate closes when the box is filled to the correct weight.

According to still another preferred but optional feature of the invention, the sampling conveyor discharges into the primary conveyor fruit passed through the apron and not retained at the collecting station.

The above and other features of this invention will be fully understood from the following detailed description and the accompanying drawings, in which:

FIG. 1 is a plan view of the presently preferred embodiment of the invention;

FIG. 2 is a cross-section taken at line 2—2 of FIG. 1;

FIG. 3 is a top view of a portion of FIG. 1;

FIG. 4 is a side elevation taken at line 4—4 of FIG. 1;

FIG. 5 is a cross-section taken at line 5—5 of FIG. 1; and

FIGS. 6 and 7 are plan views of alternate embodiments which can be substituted for portions of FIG. 1.

In FIG. 1, there is shown a fruit sampling station 10 according to the presently preferred embodiment of the invention. The sampling station is disposed adjacent to a grading table 11 and provides for sampling and carrying away for disposition of fruit which has passed over it. The grading table has a pair of side rails 12, 13, and a pair of center rails 14, 15, these dividing the sampling station into three channels 16, 17, 18. Grading tables of this type ordinarily include rolls 19 (see FIG. 2) which form an endless chain that is moved along by sprockets 20. The spacing apart of these rolls provides means for culling out undersize fruit, and their rotation as they move along turns the fruit over and over so that any blemishes can be seen by observers who stand at each side of the table. Fruit 21 is shown atop the rolls.

Channels 16 and 18 convey fruit which is passed by the graders. Cull fruit is tossed by the graders into channel 17. At the right-hand end 22 of channel 17, the cull fruit drops down onto a cull conveyor belt 23 which moves in the direction shown by arrow 24 to carry the culled fruit out of the system.

Fruit which has passed the sizing and grading operation, passes beyond right-hand end 25, 26 of channels 16 and 18 toward a primary conveyor 27. The primary conveyor is spaced from these right-hand ends. The spacing is bridged by a pair of perforated aprons 28, 29, which overhang a sampling conveyor 30. The primary and sampling conveyors lie parallel to each other and their upper surfaces move in the same direction as indicated by the arrows on them. There is thus established a path for the fruit from the channels to the primary conveyor, over and upon the aprons.

A deflector 31 is mounted by hinge 32 to a rail 32a at one edge of the sampling conveyor so that the deflector can either be swung out of the way to the position shown in dashed line, or as shown in solid line, swung out across the sampling conveyor to deflect fruit through opening 33 in the other rail 33a of this channel to a collecting station 34.

Farther along the sampling conveyor is a baffle 35 which deflects the fruit through opening 36 in rail 32a to return fruit not actually used in a sample to the primary conveyor. The primary conveyor thus discharges all fruit which reaches it, directly from the grading table, plus excess fruit from the sampling conveyor, to the next stage of the field station, which ordinarily is a bin for transporting the fruit to a place of use, such as a cannery.

Aprons 28 and 29 are identical. Therefore, only apron 29 will be described in detail. It is shown in FIG. 3. This apron may conveniently comprise a flexible fabric-reinforced rubber sheet 40 having three perforations 41, 42, 43 therethrough. These perforations are circular holes having a diameter somewhat greater than the maximum fruit size they are to pass. Arrow 44 indicates the axis of the sheet which is parallel to the forward direction of the path of the fruit from the grading table toward the primary conveyor. Arrow 44 defines a direction sometimes referred to as "longitudinal" herein. Arrow 45, which is perpendicular to arrow 44, indicates a direction sometimes referred to as "lateral" herein. The perforations are longitudinally and laterally spaced apart. The lateral spacing and number of holes is such that fruit can be withdrawn from any lateral position on the path, and the longitudinal spacing is such that only one perforation is effective in sampling fruit at any one time.

Apron 29 is attached at one end to a reel 46 which is (FIGS. 1 and 2) journaled between side rail 12 and center rail 14. A like reel on which apron 28 is supported is journaled in side rail 13 and center rail 15. A hand wheel 47 is provided for turning reel 46. A similar hand wheel (not shown) is provided for the other reel. Alternatively, the reels could be interconnected so as to be turned by one wheel. A brake (not shown) may be provided, if desired, to hold the reels in an adjusted position.

A roller 48 is journalled in the same rails as the respective reel is mounted to. The flexible apron hangs over it. A weight 49 (see FIG. 2) keeps the flexible sheet taut.

It will be seen from FIG. 2 that fruit from the grading table drops onto the apron and rolls along it to the primary conveyor, except for that portion which falls through the perforations. The spacing between where the fruit falls on the apron and the roller where it rolls off the apron is no greater than the longitudinal spacing-apart of the hole so that any position of the apron where one of the perforations is located in the path so as to receive and pass fruit, the other two (or however many there may be) will be disposed out of the path of the fruit.

By turning the hand wheel, an inspector may locate a selected one of the perforations on a selected lateral portion of the path, and thus can sample fruit from a selected part of the flow. This secures a random selection of the fruit by selecting fruit from a small lateral band of the path. This easy adjustment, which can readily be changed at any time, enables an inspector to frustrate any attempt on the part of graders to divert sub-standard fruit to a portion of the path where the inspector might be unlikely to withdraw a sample. Thus, a gross sample is rendered totally random. This sample is, however, larger than that which is ordinarily actually looked at by the inspector, so means are provided for permitting him to withdraw batches at will and to return the rest to the primary conveyor.

The gross sample falls upon the sampling conveyor which carries it along until it reaches deflector 31. When the inspector desires to collect fruit, he simply swings the deflector to the position shown in solid line, and it can be fastened there if desired. Alternatively and preferably, the deflector is spring-loaded so that when the fruit piles up behind it to a given amount, it overpowers the spring, swinging the deflector toward the dashed position and returning excess fruit to the primary conveyor.

When a sample is to be gathered at the collecting station, the deflector is swung to the position shown in solid line, so that the fruit will be deflected through opening 33 to the collecting station. The collecting station is shown in detail in FIGS. 4 and 5. This station includes a means for loading a sample box 55 to a predetermined net weight, which in practice is usually 40 lbs. A scale 56 is shown in FIG. 4 as a platform 57 mounted on a beam 58 which rests upon a fulcrum 59 and carries an adjustable counterweight 60. A limit switch 61 is adapted to be contacted by some part of the scale, such as by the platform as shown, when the scale has deflected to the position indicative of a box filled to the proper weight.

Fruit to be discharged into the box passes from opening 33 through chute 62, passage of fruit through the chute being controlled by a gate 63. Gate 63 is swingably mounted to the upper wall of orifice 62 by hinge 64. The gate includes a bifurcated lever 65, one arm of which carries a plurality of flexible rubber fingers 66 which project downward. The other arm joins to one end of a link 67. The other end of link 67 is connected to the plunger 68 of a solenoid 69.

The solenoid has a coil (not shown) for pulling the plunger upward and thereby moving the gate to the position shown in dashed line. The plunger is spring-loaded down by spring 70, so that when current is not on to actuate the coil of the solenoid, the gate assumes the position shown in solid line in FIG. 5. The flexible fingers assure that closure of the gate will not bruise or damage the fruit. This is desirable because the fruit at this point is that which will be looked at by the inspector, and, of course, any damage which occurs to it at this gate would be regarded as typical of all of the fruit in process which would be inaccurate.

A circuit 75 is provided for controlling the operation of gate 63. It is desirable for the gate to be open while the sample is to be taken, and to be closed once the box is filled to a desired weight and to remain closed while a full box is removed and an empty box is placed on the beam. A relay circuit is provided for this purpose. This circuit is shown in FIG. 5. It includes a battery 76 or other relay current source. One terminal 77 of limit switch 61 is connected to one side of battery 76. This switch is normally open, being closed only when the scale is in the condition indicative of a full box resting upon it. The other terminal 78 of switch 61 is connected to terminal 79 of winding 80 of relay 81. The other terminal 82 of the winding is connected to the other side of the battery.

The relay has a pair of normally open relay switches 83, 84; that is, these switches are open when the coil is not actuated. Terminal 85 of switch 83 is connected to terminal 79, and terminal 86 of the same switch is connected to terminal 87 of a normally closed starter switch 88. Terminal 89 of the starter switch is connected to the battery. The starter switch is manually operable, spring-loaded closed.

Relay switch 84 is for controlling application of power to the solenoid. Its terminals 90, 91 are connected one to a power source, and the other to one side of the solenoid winding. The other side of the solenoid winding is connected to the other side of the power source. It will be understood that switch 84 is optional and that the leads of the solenoid could instead have been connected in series with switch 83, depending on the power requirements and the current-carrying capacity of switch 83.

FIG. 6 illustrates an optional embodiment of apron. Apron 100 is shown adjacent to channel 18, receiving fruit therefrom. The direction of the path of the fruit is shown by arrow 101. This apron, instead of having a plurality of perforations spaced as in FIG. 3, has only a single perforation and is wrapped on a pair of reels 102, 103 whose axes are parallel to the path of the fruit. The perforation 104 can be moved laterally across the path to take samples at any selected location. This apron may be directly substituted for either or both of aprons 28 or 29, simply by providing journal supports for the reels.

FIG. 7 shows still another optional embodiment of apron. Apron 109 is shown adjacent to channel 18, receiving fruit therefrom. This apron includes a supporting plate 110 with a lateral slot 111 therein. A flexible sheet 112 is wound between reels 113, 114 whose axes are normal to the path of the fruit. This apron includes a slit 115 which extends both laterally and longitudinally. A diamond-shaped perforation is formed by the slot and the slit. The lateral position of the perforation is determined by the longitudinal adjustment of the flexible sheet, which in turn is obtained by a turn of the reels. This apron may be directly substituted for either or both of aprons 28 and 29 with only obvious changes of supporting structure.

The operation of this device should be evident from the foregoing. When sized and graded fruit reaches the apron, all of the fruit passes over the apron to the primary conveyor except that which falls through a perforation in the apron, and the location of the perforation is adjustable as heretofore disclosed. The culled fruit is returned by the cull conveyor.

The primary conveyor carries the greater proportion of the fruit directly to a receiving bin. The sampled fruit is carried along by the sampling conveyor, and when a sample is to be taken, deflector 31 is swung into the path of the fruit so as to deflect the fruit into the chute. An empty box is placed on the scale, and starter switch 87 is momentarily opened, thereby breaking the holding circuit through switch 83 and the relay winding, and de-energizing the coil. The same de-energizing would have occurred had there been no power on in the relay. This enables the spring loading to open the gate.

Fruit flows from the chute into the box, gradually deflecting the scale beam as a function of the weight in the box. When the proper weight of fruit is in the box, the beam has deflected far enough that the platform closes switch 61. Closure of this switch completes a circuit through the winding of the relay, energizing the same and closing switches 83 and 84. Closure of this switch completes a circuit through the winding of the relay, energizing the same and closing switches 83 and 84. Closure of switch 83 forms a holding circuit (the starter switch is spring-loaded closed) which holds the relay energized. This also closes switch 84 which energizes the solenoid and closes the gate. The gate will now stay closed even though the full box is removed from the scale, and even though switch 61 opens. This is because of the holding circuit through switches 83 and 88. When the next sample is desired, starter switch 88 is momentarily opened, thereby breaking the holding circuit, de-energizing the solenoid, and the process is repeated. Thus the inspector can sample the collection on the sampling conveyor at will, and his box will automatically be filled to the correct weight. He can even secure a single sample at a number of spaced apart time periods simply by manually closing switch 61 to close the gate to cut off the sample, and opening switch 88 to re-start it.

The sampling station is, of course, in continuous operation, so that much more fruit passes along the sampling conveyor than is collected in the sampling boxes. Accordingly, deflector 31 is either swung out of the way or forced out of the way when excess fruit accumulates at opening 33. Excess fruit passes back into the main stream on the primary conveyor. It will thereby be seen that this device has means for achieving random sampling and accurate and quick weighing of appropriate samples without interference with the steady flow of the circuit as a whole, and without requiring any particular supervision by the inspector, other than occasionally changing the setting of the apron, removing and replacing boxes on the scale, and pressing a starter button. Thus, this device is classically simple and rugged in construction.

It will be evident that changes may be made to the control circuit for the solenoid by reversing polarities, powering the relay and the solenoid from the same source, etc., and also that the solenoid could be loaded so that the gate would be open when energized instead of closed when energized, by making only minor changes in the circuit shown.

The term "conveyor" herein is not to be limited to the type of continuous, belt type conveyors shown in the drawings, but is intended to include all classes of devices for moving fruit from one place to another, including chutes, slides, roller conveyors, etc.

This invention is not to be limited by the embodiments shown in the drawings and described in the description which are given by way of example and not of limitation, but only in accordance with the scope of the appended claims.

What is claimed is:

1. An object sampling station comprising: a primary conveyor; a sampling conveyor; an apron so disposed and arranged as to receive objects from a source and convey the same toward the primary conveyor, said apron bridging the sampling conveyor and thereby providing a path having a longitudinal direction across the apron from the source to the primary conveyor, and having a perforation therethrough to pass a sample of the objects through the apron to the sampling conveyor; means for selectively laterally positioning the perforation in the path of the objects; a chute adjacent to and adapted to receive objects from the sampling conveyor; a gate in said chute having an open and a closed position; a scale adapted to support a box to be filled with objects from said chute; and means regulated by said scale and connected to the gate for closing the same when the box is filled to a selected weight.

2. An object sampling station according to claim 1 in which the sampling conveyor discharges onto the primary conveyor to convey objects not passed by the chute to the primary conveyor.

3. An object sampling station according to claim 1 in which the gate has a first and a second condition corresponding to an opened and a closed position relative to flow of fruit, and in which said means regulated by the scale and connected to the gate for closing the same comprise: spring means loading the gate to its first condition, a solenoid connected to the gate and so disposed and arranged that when actuated it moves the gate to its second condition, and a control circuit comprising a limit switch so disposed and arranged as to be closed by contact with the scale when loaded to the predetermined weight, a normally closed starter switch, and a relay comprising a coil and a first and second normally open relay switch adapted to be closed when the coil is actuated, one terminal of the starter and limit switches being connected to a source of electric potential, the other terminal of the starter switch being connected to one terminal of the first relay switch, the other terminal of the first relay switch being connected to the other terminal of the limit switch, and to one terminal of the coil, the other terminal of the coil being connected to the other side of the source of electric potential, the second relay switch being connected in series with the solenoid coil and across a source of power for actuating the same, whereby actuation of the relay by closing the limit switch makes the holding circuit and applies power to the solenoid to move the gate to its second position, the gate being opened by breaking the holding circuit by opening the starter circuit, thereby de-energizing the solenoid, the circuit remaining de-energized until the second switch is again closed by the scale's actuating the limit switch in response to a predetermined weight of objects being loaded on the scale.

4. An object sampling station according to claim 1 in which the apron includes a perforation, the apron being adjustable along a lateral path relative to the longitudinal path of the objects to position the perforation at a selected lateral position along the path of the objects.

5. An object sampling station according to claim 1 in which the objects pass in a substantially linear path in a longitudinal direction, there being a plurality of perforations in the aprons spaced longitudinally and laterally apart from each other, and means for adjusting said apron so that a selected one of said perforations stands in a selected lateral portion of the path.

6. An object sampling station according to claim 1 in which the means regulated by said scale and connected to the gate for closing the same when the box is filled to a selected weight comprises: a solenoid adapted to move the gate selectively to its positions, a limit switch actuable by the scale means upon application of loading of the given weight on the scale means, and circuit means adapted to move the solenoid to its position corresponding to the second gate position in response to actuation of said limit switch by the scale.

7. An object sampling station according to claim 6 in which the circuit means comprises a relay having a first and a second relay switch, the first of said relay switches being connected to the solenoid for passing current to the same to move the gate to its second position, the other relay switch forming a portion of a holding circuit for holding the solenoid actuated after the limit switch has passed current to actuate the relay.

References Cited in the file of this patent
UNITED STATES PATENTS

| | | |
|---|---|---|
| 1,001,129 | Fairchild | Aug. 22, 1911 |
| 1,571,632 | McFarland | Feb. 2, 1926 |
| 2,367,937 | Harlow | Jan. 16, 1945 |
| 2,521,998 | Rottier | Sept. 12, 1950 |
| 2,760,748 | Ahlburg | Aug. 28, 1956 |